United States Patent
Choi et al.

(10) Patent No.: US 10,944,497 B2
(45) Date of Patent: Mar. 9, 2021

(54) METHOD FOR CONTROLLING INTER-CELL INTERFERENCE DUE TO SRS TRANSMISSION IN WIRELESS COMMUNICATION SYSTEM AND DEVICE FOR SAME

(71) Applicant: LG ELECTRONICS INC., Seoul (KR)

(72) Inventors: Kukheon Choi, Seoul (KR); Kyuhwan Kwak, Seoul (KR); Seonwook Kim, Seoul (KR); Suckchel Yang, Seoul (KR); Seungmin Lee, Seoul (KR); Jinyong Choi, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 18 days.

(21) Appl. No.: 16/488,230

(22) PCT Filed: Feb. 23, 2017

(86) PCT No.: PCT/KR2017/001987
§ 371 (c)(1),
(2) Date: Aug. 22, 2019

(87) PCT Pub. No.: WO2018/155734
PCT Pub. Date: Aug. 30, 2018

(65) Prior Publication Data
US 2019/0386764 A1   Dec. 19, 2019

(51) Int. Cl.
*H04J 11/00* (2006.01)
*H04L 5/00* (2006.01)

(52) U.S. Cl.
CPC ........ *H04J 11/0056* (2013.01); *H04L 5/0023* (2013.01); *H04L 5/0051* (2013.01)

(58) Field of Classification Search
CPC ....... H04L 5/00; H04L 5/0023; H04L 5/0032; H04L 5/00325; H04L 5/0051;
(Continued)

(56) References Cited

U.S. PATENT DOCUMENTS 10,506,566 B2 *  12/2019  Choi .................... H04L 5/0023
10,638,489 B2 *  4/2020  Noh ..................... H04W 28/04
(Continued)

FOREIGN PATENT DOCUMENTS

| KR | 1020110108359 | 10/2011 |
| WO | 2015133812 | 9/2015 |
| WO | 2016076614 | 5/2016 |

OTHER PUBLICATIONS

PCT International Application No. PCT/KR2017/001987, Written Opinion of the International Searching Authority dated Nov. 23, 2017, 18 pages.

*Primary Examiner* — Tri H Phan

(57) ABSTRACT

A method for controlling inter-cell interference due to sounding reference symbol (SRS) transmission of an inter-cell terminal to which a base station belongs by the base station in a wireless communication system can comprise the steps of: receiving, from an adjacent base station, information relating to a physical resource region causing interference in adjacent cells due to SRS transmission of a terminal, identifier information of the terminal and transmission beam identifier information of the terminal; and allocating a different uplink channel or allocating an SRS corresponding to a transmission beam identifier other than the transmission beam identifier of the terminal to the physical resource region of the terminal.

14 Claims, 15 Drawing Sheets

(58) Field of Classification Search
CPC ............. H04L 5/0073; H04L 25/03821; H04L 25/085; H04L 27/2691; H04W 72/04; H04W 72/082; H04J 11/00; H04J 11/005; H04J 11/0056; H04J 11/0059; H04B 7/0404; H04B 7/0408; H04B 7/0695; H04B 2001/1045
See application file for complete search history.

(56) References Cited

U.S. PATENT DOCUMENTS

| | | |
|---|---|---|
| 2014/0098695 A1 | 4/2014 | Jeong et al. |
| 2016/0219570 A1 | 7/2016 | Guo et al. |
| 2019/0200359 A1* | 6/2019 | Choi .................... H04L 25/0224 |
| 2019/0379560 A1* | 12/2019 | Choi ..................... H04L 27/261 |

\* cited by examiner

METHOD FOR CONTROLLING INTER-CELL INTERFERENCE DUE TO SRS TRANSMISSION IN WIRELESS COMMUNICATION SYSTEM AND DEVICE FOR SAME

CROSS-REFERENCE TO RELATED APPLICATIONS

This application is the National Stage filing under 35 U.S.C. 371 of International Application No. PCT/KR2017/001987, filed on Feb. 23, 2017, the contents of which are all hereby incorporated by reference herein in their entirety.

TECHNICAL FIELD

The present invention relates to wireless communication and, more particularly, to a method of controlling inter-cell interference caused by Sounding Reference Signal (SRS) transmission in a wireless communication system and an apparatus therefor.

BACKGROUND

With the introduction of a new radio access technology (RAT) system, as more and more communication devices require greater communication capacity, there is a need for mobile broadband communication enhanced over conventional Radio Access Technology (RAT). In addition, massive Machine Type Communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced Mobile Broadband (eMBB) communication, massive MTC (mMTC), and Ultra-Reliable and Low Latency Communication (URLLC).

DISCLOSURE OF THE INVENTION

Technical Task

An object of the present invention is to provide a method of controlling inter-cell interference caused by Sounding Reference Signal (SRS) transmission in a wireless communication system.

Another object of the present invention is to provide a serving base station for controlling inter-cell interference caused by SRS transmission in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present invention, provided herein is a method of controlling, by a Base Station (BS), inter-cell interference caused by Sounding Reference Signal (SRS) transmission of a User Equipment (UE) in a cell to which the BS belongs in a wireless communication system, including receiving information about a physical resource region in which interference is caused with respect to a neighboring cell by the SRS transmission of the UE, information about an identifier (ID) of the UE, and information about a transmission beam ID of the UE from a neighboring BS; and allocating an SRS or another uplink channel corresponding to a transmission beam ID other than the transmission beam ID of the UE in the physical resource region to the UE.

The information about the physical resource region may include at least one of information about a resource length on a frequency domain allocated for localized SRS transmission on a specific symbol or information about a physical resource starting point for the localized SRS transmission.

A resource length of the localized SRS in the allocated frequency domain may correspond to a common divisor of a resource length of a whole band SRS in the frequency domain.

The method may further include transmitting information indicating that an SRS corresponding to the transmission beam ID other than the transmission beam ID of the UE has been allocated to the UE. The method may further include receiving the SRS corresponding to the transmission beam ID other than the transmission beam ID of the UE through the physical resource region from the UE.

The information about the physical resource region may include information indicating a physical resource location of a localized SRS unit on a specific symbol.

In another aspect of the present invention, provided herein is a Base Station (BS) for controlling inter-cell interference caused by Sounding Reference Signal (SRS) transmission of a User Equipment (UE) in a cell to which the BS belongs in a wireless communication system, including a receiver; and a processor, wherein the processor controls the receiver to receive information about a physical resource region in which interference is caused with respect to a neighboring cell by the SRS transmission of the UE, information about an identifier (ID) of the UE, and information about a transmission beam ID of the UE from a neighboring BS, and allocates an SRS or another uplink channel corresponding to a transmission beam ID other than the transmission beam ID of the UE in the physical resource region to the UE.

The information about the physical resource region may include at least one of information about a resource length on a frequency domain allocated for localized SRS transmission on a specific symbol or information about a physical resource starting point for the localized SRS transmission.

A resource length of the localized SRS in the allocated frequency domain may correspond to a common divisor of a resource length of a whole band SRS in the frequency domain.

The serving BS may further include a transmitter, wherein the processor may control the transmitter to transmit information indicating that an SRS corresponding to the transmission beam ID other than the transmission beam ID of the UE has been allocated to the UE.

The processor may control the receiver to receive the SRS corresponding to the transmission beam ID other than the transmission beam ID of the UE through the physical resource region from the UE.

The information about the physical resource region may include information indicating a physical resource location of a localized SRS unit on a specific symbol.

Advantageous Effects

According to an embodiment of the present invention, an efficient interference measurement method may be supported in terms of Inter-Cell Interference Coordination (ICIC) and communication performance may be improved through resource allocation between a serving cell and prepared cells, when multiplexing of a localized SRS, a whole band SRS, and another uplink channel is supported.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

MODE FOR INVENTION

Figure 1:
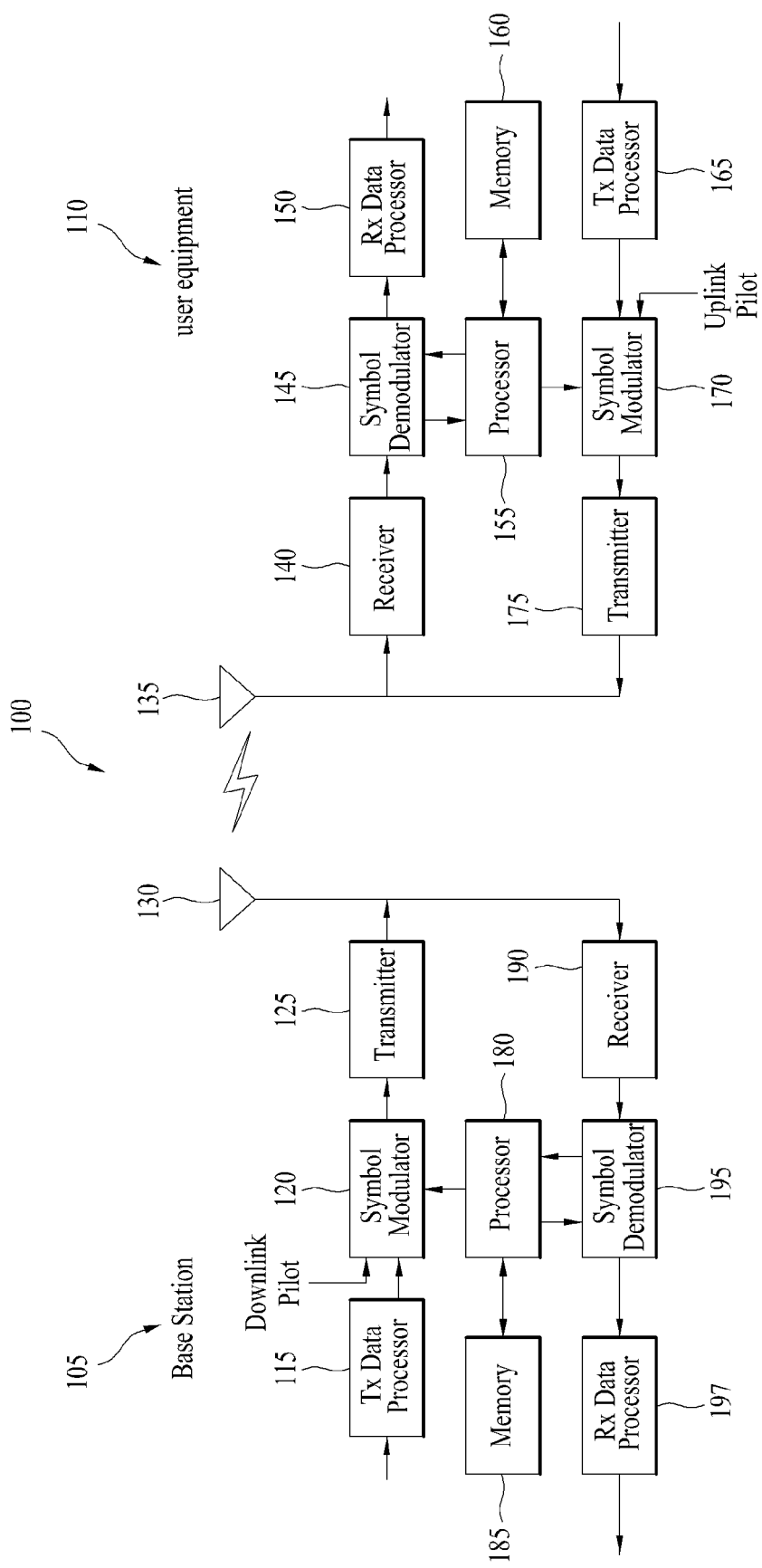
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

For UE Tx beam tracking, a UE needs to transmit an SRS for each candidate Tx beam of the UE. However, if SRSs are transmitted toward many beam directions (in accordance with a UE's Tx beam set for all directions), it may result in significant resource waste. Accordingly, the present disclosure proposes a method of performing an adaptive UE Tx beam tracking by performing SRS transmission flexibly according to UE pattern changes.

First, Table 1 below shows details of SRS transmission in the 3GPP LTE/LTE-A system.

TABLE 1

A UE shall transmit Sounding Reference Symbol (SRS) on per serving cell SRS resources based on two trigger types:
trigger type 0: higher layer signalling
trigger type 1: DCI formats 0/4/1A for FDD and TDD and DCI formats 2B/2C/2D for TDD.
In case both trigger type 0 and trigger type 1 SRS transmissions would occur in the same subframe in the same serving cell, the UE shall only transmit the trigger type 1 SRS transmission.
A UE may be configured with SRS parameters for trigger type 0 and trigger type 1 on each serving cell. The following SRS parameters are serving cell specific and semi-statically configurable by higher layers for trigger type 0 and for trigger type 1.
Transmission comb $\bar{k}_{TC}$, as defined in subclause 5.5.3.2 of [3] for trigger type 0 and each configuration of trigger type 1
Starting physical resource block assignment $n_{RRC}$, as defined in subclause 5.5.3.2 of [3] for trigger type 0 and each configuration of trigger type 1
duration: single or indefinite (until disabled), as defined in [11] for trigger type 0
srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,\,1}$, and SRS subframeoffset $T_{SRS,\,1}$, as defined in Table 8.2-4 and Table 8.2-5 trigger type 1
SRS bandwidth $B_{SRS}$, as defined in subclause 5.5.3.2 of [3] for trigger type 0 and each configuration of trigger type 1
Frequency hopping bandwidth, $b_{hop}$, as defined in subclause 5.5.3.2 of [3] for trigger type 0
Cyclic shift $n_{SRS}^{cs}$, as defined in subclause 5.5.3.1 of [3] for trigger type 0 and each configuration of trigger type 1
Number of antenna ports $N_p$ for trigger type 0 and each configuration of trigger type 1
For trigger type 1 and DCI format 4 three sets of SRS parameters, srs-ConfigApDCI-Format4, are configured by higher layer signalling. The 2-bit SRS request field [4] in DCI format 4 indicates the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format1a2b2c, is configured by higher layer signalling. The SRS request field is 1 bit [4] for DCI formats 0/1A/2B/2C/2D, with a type 1 SRS triggered if the value of the SRS request field is set to '1'.
A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
|---|---|
| '00' | No type 1 SRS trigger |
| '01' | The $1^{st}$ SRS parameter set configured by higher layers |
| '10' | The $2^{nd}$ SRS parameter set configured by higher layers |
| '11' | The $3^{rd}$ SRS parameter set configured by higher layers |

Table 3 below shows additional details of the SRS transmission in the 3GPP LTE/LTE-A system.

TABLE 3

The serving cell specific SRS transmission bandwidths CSRS are configured by higher layers. The allowable values are given in subclause 5.5.3.2 of [3].
The serving cell specific SRS transmission sub-frames are configured by higher layers. The allowable values are given in subclause 5.5.3.3 of [3].
For a TDD serving cell, SRS transmissions can occur in UpPTS and uplink subframes of the UL/DL configuration indicated by the higher layer parameter subframe Assignment for the serving cell.
When closed-loop UE transmit antenna selection is enabled for a given serving cell for a UE that supports transmit antenna selection, the index a(nSRS), of the UE antenna that transmits the SRS at time nSRS is given by
a(nSRS) = nSRS mod 2, for both partial and full sounding bandwidth, and when frequency hopping is disabled (i.e., __),
__
when frequency hopping is enabled (i.e. __),
where values BSRS, bhop, Nb, and nSRS are given in subclause 5.5.3.2 of [3], and __ (where __regardless of the Nb value), except when a single SRS transmission is configured for the UE. If a UE is configured with more than one serving cell, the UE is not expected to transmit SRS on different antenna ports simultaneously.
A UE may be configured to transmit SRS on Np antenna ports of a serving cell where Np may be configured by higher layer signalling. For PUSCH transmission mode 1 __ and for PUSCH transmission mode 2 __ with two antenna ports configured for PUSCH and __ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell.
The SRS transmission bandwidth and starting physical resource block assignment are the same for all the configured antenna ports of a given serving cell.
A UE not configured with multiple TAGs shall not transmit SRS in a symbol whenever SRS and PUSCH transmissions happen to overlap in the same symbol.

TABLE 3-continued

For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE.
If a UE is not configured with multiple TAGs, or if a UE is configured with multiple TAGs and SRS and PUCCH format 2/2a/2b happen to coincide in the same subframe in the same serving cell,
The UE shall not transmit type 0 triggered SRS whenever type 0 triggered SRS and PUCCH format 2/2a/2b transmissions happen to coincide in the same subframe;
The UE shall not transmit type 1 triggered SRS whenever type 1 triggered SRS and PUCCH format 2a/2b or format 2 with HARQ-ACK transmissions happen to coincide in the same subframe;
The UE shall not transmit PUCCH format 2 without HARQ-ACK whenever type 1 triggered SRS and PUCCH format 2 without HARQ-ACK transmissions happen to coincide in the same subframe.
If a UE is not configured with multiple TAGs, or if a UE is configured with multiple TAGs and SRS and PUCCH happen to coincide in the same subframe in the same serving cell,
The UE shall not transmit SRS whenever SRS transmission and PUCCH transmission carrying HARQ-ACK and/or positive SR happen to coincide in the same subframe if the parameter ackNackSRS-SimultaneousTransmission is FALSE;
For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE.
Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE.
A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe.
In UpPTS, whenever SRS transmission instance overlaps with the PRACH region for preamble format 4 or exceeds the range of uplink system bandwidth configured in the serving cell, the UE shall not transmit SRS.
The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured.
This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR.
Trigger type 0 SRS configuration of a UE in a serving cell for SRS periodicity, TSRS, and SRS subframe offset, Toffset, is defined in Table 8.2-1 and Table 8.2-2, for FDD and TDD serving cell, respectively. The periodicity TSRS of the SRS transmission is serving cell specific and is selected from the set {2, 5, 10, 20, 40, 80, 160, 320} ms or subframes.
For the SRS periodicity TSRS of 2 ms in TDD serving cell, two SRS resources are configured in a half frame containing UL subframe(s) of the given serving cell.
Type 0 triggered SRS transmission instances in a given serving cell for TDD serving cell with TSRS > 2 and for FDD serving cell are the subframes satisfying _, where for FDD kSRS = {0, 1, , , , 0} is the subframe index within the frame, for TDD serving cell kSRS is defined in Table 8.2-3. The SRS transmission instances for TDD serving cell with TSRS = 2 are the subframes satisfying kSRS - Toffset.
For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS in a subframe of radio frame m that is indicated by the parameter eimta-HarqReferenceConfig-r12 as a downlink subframe unless the UE transmits PUSCH in the same subframe.
Trigger type 1 SRS configuration of a UE in a serving cell for SRS periodicity, TSRS, 1, and SRS subframe offset, Toffset, 1, is defined in Table 8.2-4 and Table 8.2-5, for FDD and TDD serving cell, respectively. The periodicity TSRS, 1 of the SRS transmission is serving cell specific and is selected from the set {2, 5, 10} ms or subframes.
For the SRS periodicity TSRS, 1 of 2 ms in TDD serving cell, two SRS resources are configured in a half frame containing UL subframe(s) of the given serving cell.
A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c.
A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c.
A UE configured for type 1 triggered SRS transmission on serving cell c upon detection of a positive SRS request in subframe n of serving cell c shall commence SRS transmission in the first subframe satisfying
_ and
_ for TDD serving cell c with TSRS, 1 > 2 and for FDD serving cell c,
_ for TDD serving cell c with TSRS, 1 = 2
where for FDD serving cell c _ is the subframe index within the frame nf, for TDD serving cell c kSRS is defined in Table 8.2-3.
A UE configured for type 1 triggered SRS transmission is not expected to receive type 1 SRS triggering events associated with different values of trigger type 1 SRS transmission parameters, as configured by higher layer signalling, for the same subframe and the same serving cell.

TABLE 3-continued

For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe.
A UE shall not transmit SRS whenever SRS and a PUSCH transmission corresponding to a Random Access Response Grant or a retransmission of the same transport block as part of the contention based random access procedure coincide in the same subframe.

Table 4 below shows the subframe offset configuration ($T_{offset}$) and UE-specific SRS periodicity ($T_{SRS}$) for trigger type 0 in FDD.

TABLE 4

| SRS Configuration Index $I_{SRS}$ | SRS Periodicity (ms) | SRS 서브프레임 Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

Table 5 below shows the subframe offset configuration ($T_{offset}$) and UE-specific SRS periodicity ($T_{SRS}$) for trigger type 0 in TDD.

TABLE 5

| SRS Configuration Index $I_{SRS}$ | SRS Periodicity (ms) | SRS 서브프레임 Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-36 | 20 | $I_{SRS} - 17$ |
| 37-76 | 40 | $I_{SRS} - 37$ |
| 77-156 | 80 | $I_{SRS} - 77$ |
| 157-316 | 160 | $I_{SRS} - 157$ |
| 317-636 | 320 | $I_{SRS} - 317$ |
| 637-1023 | reserved | reserved |

TABLE 6

| SRS Configuration Index $I_{SRS}$ | SRS Periodicity (ms) | SRS subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |
| 15-24 | 10 | $I_{SRS} - 15$ |
| 25-44 | 20 | $I_{SRS} - 25$ |
| 45-84 | 40 | $I_{SRS} - 45$ |
| 85-164 | 80 | $I_{SRS} - 85$ |
| 165-324 | 160 | $I_{SRS} - 165$ |
| 325-644 | 320 | $I_{SRS} - 325$ |
| 645-1023 | reserved | reserved |

Table 7 shows $k_{SRS}$ for TDD.

TABLE 7

| | 서브프레임 index n | | | | | | | | | | |
|---|---|---|---|---|---|---|---|---|---|---|---|
| | | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

Table 8 below shows the subframe offset configuration ($T_{offset,1}$) and UE-specific SRS periodicity ($T_{SRS,1}$) for trigger type 1 in FDD.

TABLE 8

| SRS Configuration Index $I_{SRS}$ | SRS Periodicity (ms) | SRS subframe Offset |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

Table 9 below shows the subframe offset configuration ($T_{offset,1}$) and UE-specific SRS periodicity ($T_{SRS,1}$) for trigger type 1 in TDD.

TABLE 9

| SRS Configuration Index $I_{SRS}$ | SRS Periodicity (ms) | SRS subframe Offset |
|---|---|---|
| 0 | reserved | reserved |
| 1 | 2 | 0, 2 |

TABLE 9-continued

| SRS Configuration Index $I_{SRS}$ | SRS Periodicity (ms) | SRS subframe Offset |
|---|---|---|
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-31 | reserved | reserved |

Table 10 below shows additional channel variation characteristics (blockage effects) of a channel above 6 GHz compared to a channel below 6 GHz.

TABLE 10

| Ref. | Test description | Tx height | Rx height | Test frequency | Blockage rate relative parameter |
|---|---|---|---|---|---|
| [2] | One blocker moving (1 m/s) Horn(22.4 dBi, 12°) Patch(4.3 dBi/2.2 dBi, 58°) 4 blockers moving | 2.2/1.2 m | 1.2 m | 60 GHz | Series of Blockage event duration(threshold 5 dB) 780~1839 ms(Horn) 640~1539 ms(Patch) Series of Blockage event duration(threshold 5 dB) 688 ms(Horn, average) 278 ms(Patch, average) |
| [5] | 1-15 blockers moving The horns(22.4 dBi, 12° in azimuth, about 10° in elevation) The patches (about 3 dBi, 60° both in elevation and azimuth. The vertical polarization) | 1.58/2.77 m | 1.55 m | 60 GHz | Series of Blockage event duration (Threshold 10 dB)          (Threshold 20 dB) 300 ms(1~5 persons)      100 ms(1~5 persons) 350 ms(6~10 persons)    150 ms(6~10 persons) 450 ms(11~15 persons)   300 ms(11~15 persons) |
| [6] | — | — | — | 60 GHz | 93 ms(Mean Drop Rate) |
| [7] | One blocker moving(Walking speed) 20 dBi, 10° | 1.1 m | 0.75 m | 67 GHz | $t_D$ = 230 ms (average, Threshold 20 dB) |
| [8] | One blocker moving(Walking speed) 20 dBi, 10° | 1.1 m | 0.75 m | 67 GHz | $t_D$ = 370 ms~820 ms $t_{decay}$ = 230 ms (mean), 92 ms(s.d)(Threshold 20 dB) $t_{rising}$ = 220 ms (mean), 100 ms(s.d)(Threshold 20 dB) |

Figure 2A:
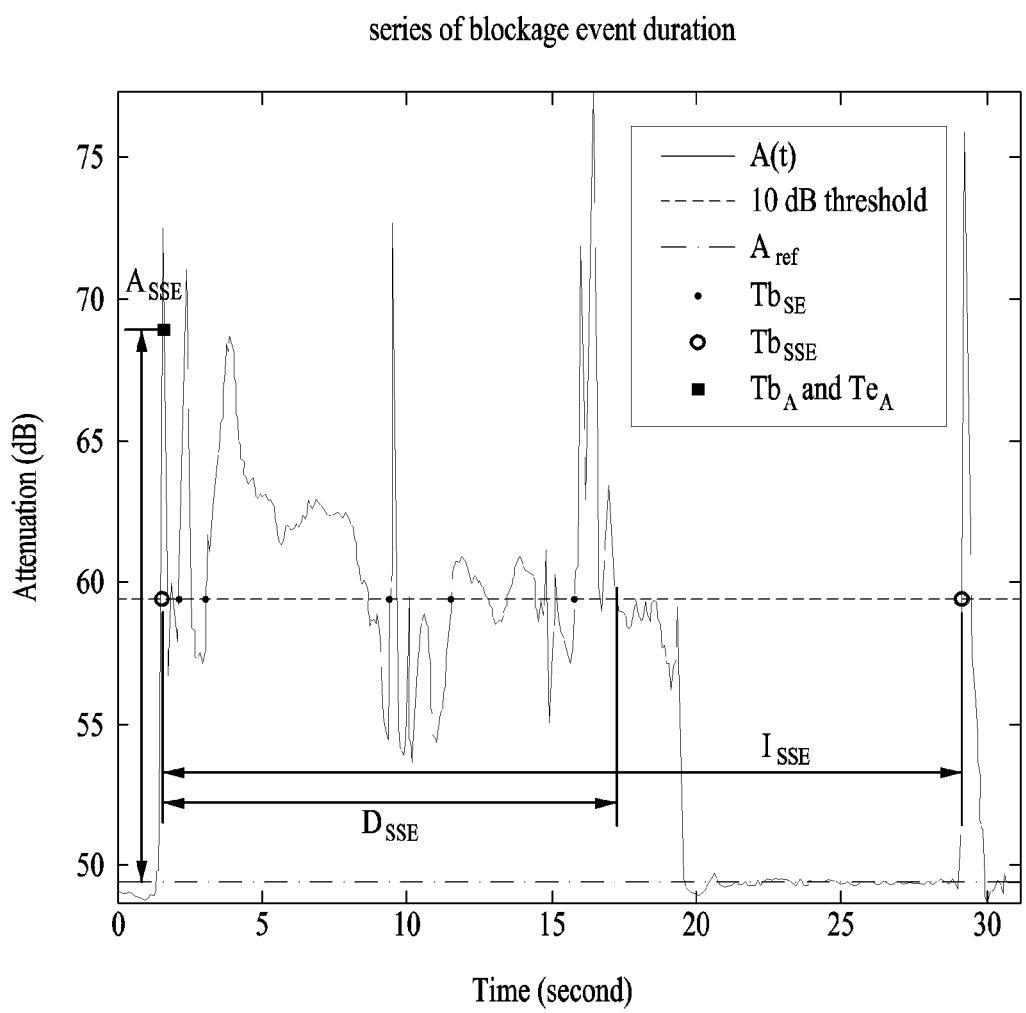
FIG. 2a shows the series of blockage event duration in Table 10 during which important blockages occur.
Figure 2B:
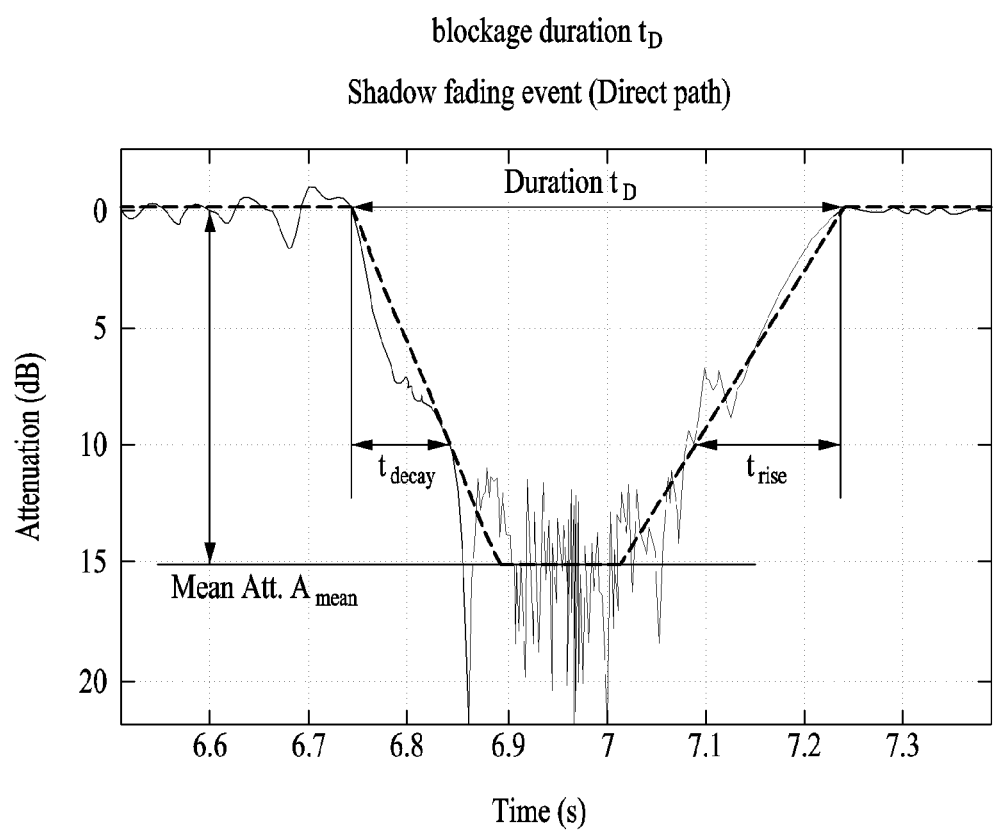
FIG. 2b shows the blockage duration ($t_D$) in Table 2.

FIG. 2 is a diagram illustrating blockage duration with reference to Table 10. Specifically, FIG. 2a shows the series of blockage event duration in Table 10 during which important blockages occur, and FIG. 2b shows the blockage duration (to) in Table 2. That is, the series of blockage event duration indicates the time during which important blockages occur, and to indicates the period between occurrence of a blockage and the when blockage ends and the system goes back to a normal state.

Table 11 shows a pattern relationship between a UE and $t_{decay}$ and $t_{rising}$.

TABLE 11

| | Walking (0.6 m/s)[7] | Sprinting (10 m/s)[9] | Swift Hand swing (43 m/s) |
|---|---|---|---|
| $t_{decay}$, $t_{rising}$ (ms) | 150 ms (measure) | 9 ms (calculation) | 2.093 ms (calculation) |

Although Table 11 shows that a blockage change is basically estimated to about average 100 ms (the speed of a walking obstacle (4 km/h)), it can vary from 2 ms to hundreds of ms depending on UE's patterns and surrounding environments.

Necessity for Beam Tracking

Figure 3:
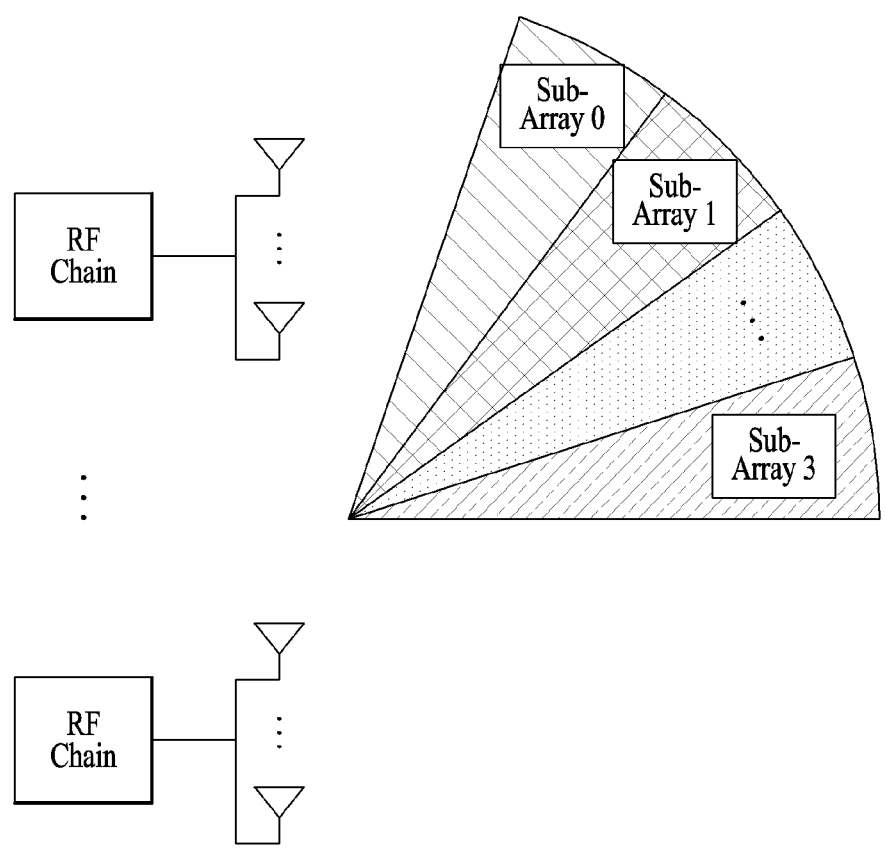
FIG. 3 is a diagram illustrating a wide beam composed of four narrow beams.

When multiple beams are properly placed, a wide beam can be defined as shown in FIG. 3.

FIG. 3 is a diagram illustrating a wide beam composed of four narrow beams.

Referring to FIG. 3, the wide beam is defined using four sub-arrays. The present disclosure assumes that a transmitter transmits a synchronization signal using the wide beam. In other words, it is assumed that the same Primary Synchronization Signal/Secondary Synchronization Signal/Physical Broadcast Channel (PSS/SSS/PBCH) is transmitted on all sub-arrays.

Meanwhile, when multiple beams are defined to cover a wide area, beam gain may decrease. To solve the above trade-off, additional power gain can be provided by repeating transmission in the time domain. Based on the repeated transmission, a structure of a synchronization subframe may be shown in FIG. 4.

Figure 4:
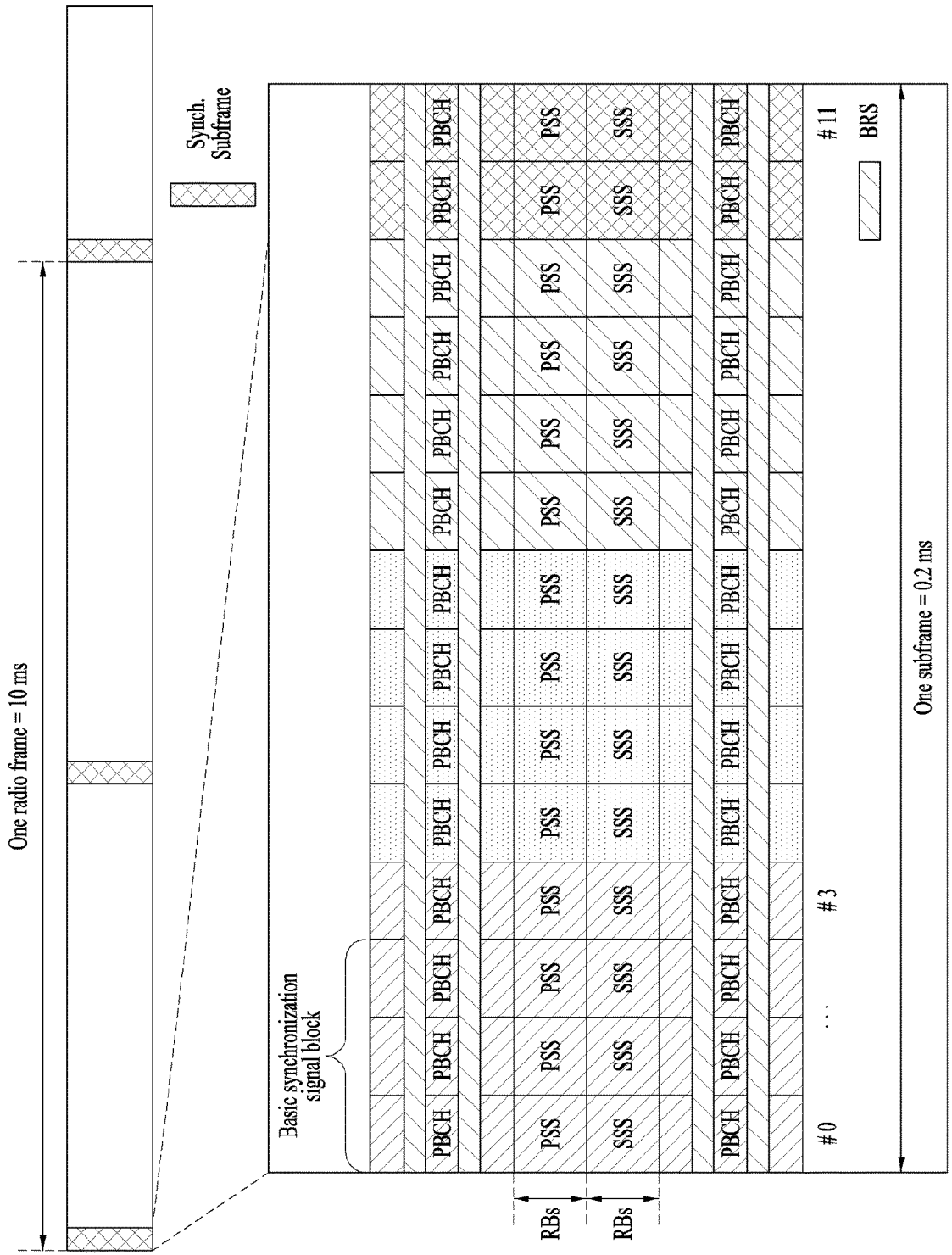
FIG. 4 is a diagram illustrating the structure of a synchronization subframe.

FIG. 4 is a diagram illustrating the structure of a synchronization subframe.

Specifically, FIG. 4 shows not only the structure of the synchronization subframe but also PSS/SSS/PBCH defined therein. In FIG. 4, blocks with the same type of hatching indicate a group of Orthogonal Frequency Division Multiplexing (OFDM) symbols where the same RF beam group (defined using four sub-array beams) is applied. That is, four OFDM symbols use the same multi-RF beam. In new RAT, based on the structure of FIG. 4, a beam scanning period can be generally configured as shown in FIG. 5.

Figure 5:
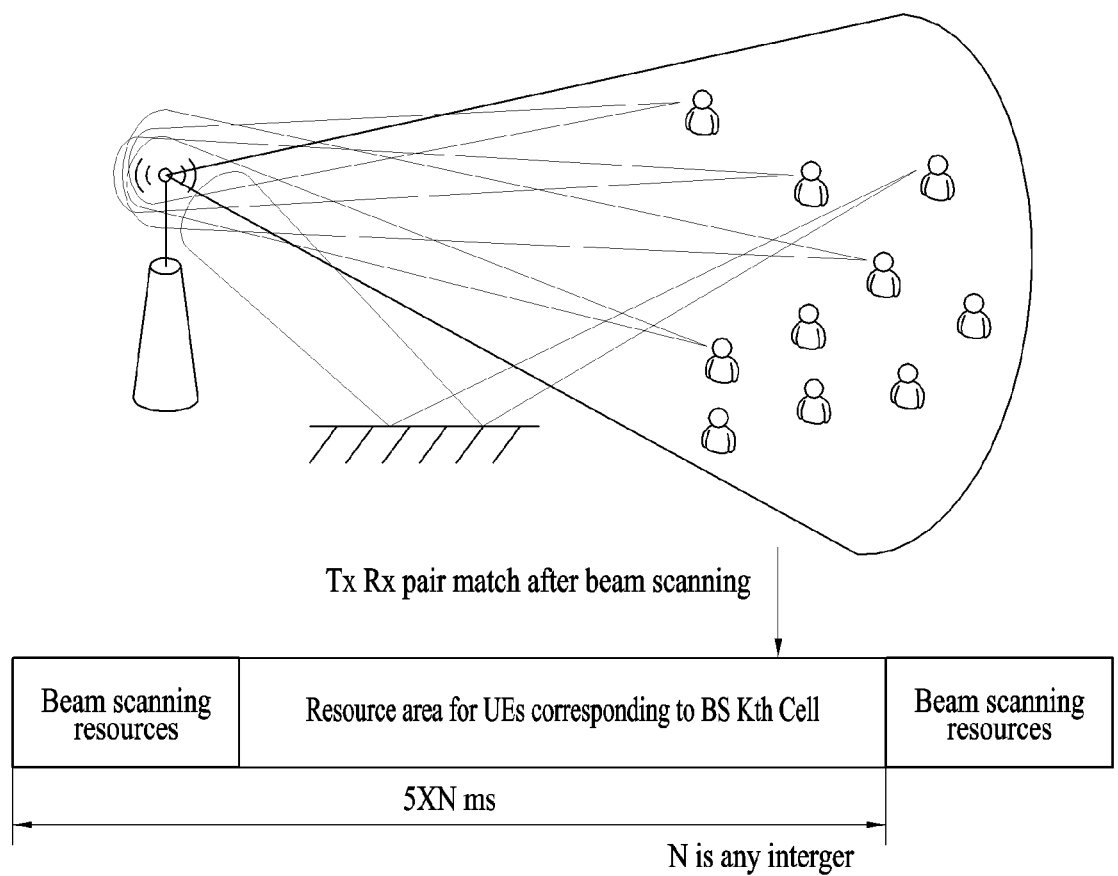
FIG. 5 is a diagram illustrating a beam scanning period and a resource area (for example, 5×N ms period).

FIG. 5 is a diagram illustrating a beam scanning period and a resource area (for example, 5×N ms period).

Since a beam scanning process basically has significant processing overhead, beam scanning cannot be completed within a very short period. In addition, the temporal variation of a channel above 6 GHz is expected to be much faster than that of a channel below 6 GHz due to the aforementioned additional channel elements. Moreover, in a cellular system, a Base Station (BS) may have a fixed beam configuration, whereas a UE may have different beams depending on serving cell locations, changes in its surrounding environment, UE behavior patterns, etc. That is, a Tx/Rx beam mismatch is highly likely to occur within a beam scanning period. To overcome the Tx/Rx beam mismatch, a beam tracking method is required.

In the case of downlink transmission, beam tracking can be performed by applying a UE Rx beam to each of the BRSs shown in FIG. 4 and measuring Reference Signal Received Power (RSRP) thereof. If reciprocity is established between Tx/Rx beam pairs (i.e., BS Tx beam/UE Rx beam pair and UE Tx beam/BS Rx beam pair) for downlink transmission, a Tx/Rx beam pair obtained from each BRS can be applied to uplink transmission. Otherwise, an SRS may be used for uplink transmission. To achieve the most powerful uplink beam tracking, SRSs should be transmitted for all Tx beam IDs of each UE. However, this SRS transmission may decrease a Physical Uplink Shared Channel (PUSCH) transmission region, and thus uplink throughput may decrease.

Figure 6:
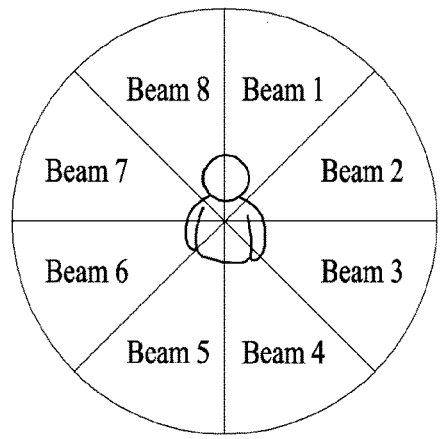
FIG. 6 is a diagram transmission of SRSs corresponding to UE beam IDs (the number of UE Tx beam IDs=8).

FIG. 6 is a diagram transmission of SRSs corresponding to UE beam IDs (the number of UE Tx beam IDs=8).

It can be seen from FIG. 6 that as the number of UE beam IDs increases, the SRS transmission region increases. If periodic SRS transmission is introduced to beam tracking for matching a pair of UE Tx beams and BS RX beams, that is, for establishing UE Tx/BS Rx beam pairs, the number of SRSs for fixed UE Tx candidate beams may be configured by higher layers (for example, a BS may inform the number of SRS transmissions for the fixed UE Tx candidate beams via higher layer signaling (e.g., RRC signaling)). However, if aperiodic SRS transmission is introduced, an additional SRS transmission region is required for additional UE Tx candidate beams. In addition, as the aperiodic SRS transmission is triggered by a UE or a BS, an SRS transmission configuration, which is generated for aperiodic beam tracking, may be presented differently in each beam tracking subframe. Moreover, signaling information for the beam tracking should be provided to UEs whenever the aperiodic SRS transmission is triggered. As a result, signaling overhead may increase. Therefore, a method of efficiently arranging an SRS transmission region and a PUSCH transmission region and a method of reducing signaling overhead thereof are required.

Figure 7:
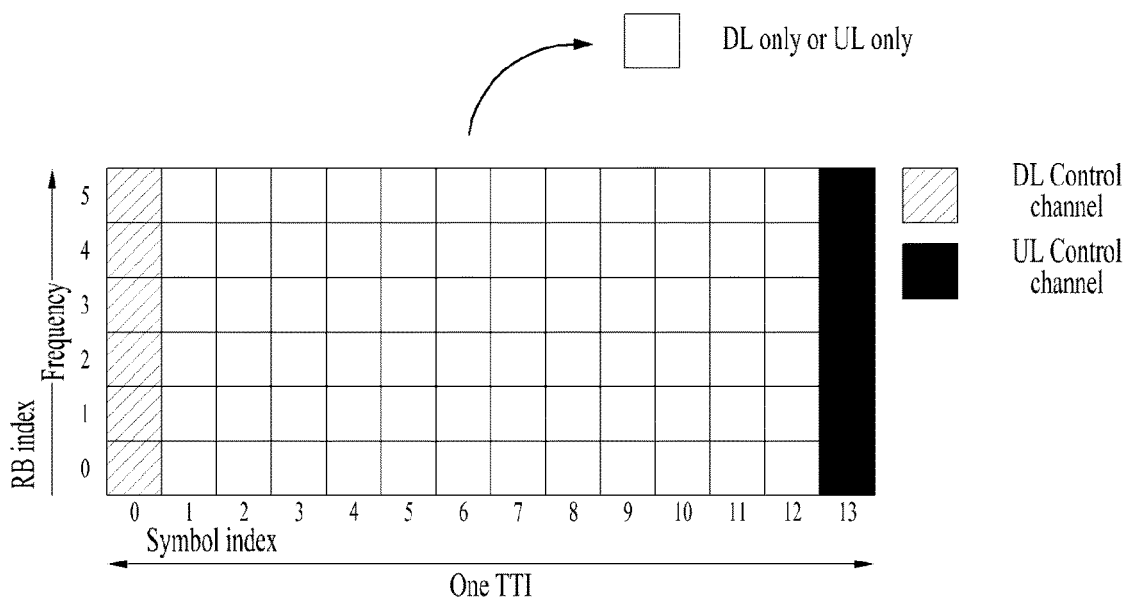
FIG. 7 is a diagram illustrating the structure of a subframe where TDM is applied to data and control channels.

FIG. 7 is a diagram illustrating the structure of a subframe where TDM is applied to data and control channels.

Specifically, FIG. 7 shows that TDM is applied to data and control channels in one subframe. In FIG. 7, the hatched area represents a Downlink (DL) control region (i.e., a resource region in which a DL control channel is transmitted), and the black area represents an Uplink (UL) control region (i.e., a resource region in which a UL control channel is transmitted). The unmarked area in the subframe of FIG. 7 can be used for DL or UL data transmission. According to this structure, it is possible to transmit DL data and receive UL ACK/NACK in a single subframe since DL transmission and UL transmission are sequentially performed in the single subframe. Consequently, when a data transmission error occurs, it is possible to reduce a time required until data is retransmitted, thereby minimizing the latency of the overall data transmission.

In the above subframe structure where the data and control channels are Time Division Multiplexed (TDMed), a time gap is required to allow a BS and a UE to switch from transmission mode to reception mode or vice versa. To this end, some Orthogonal Frequency Division Multiplexing (OFDM) symbols at the DL-to-UL switching time can be configured as a Guard Period (GP) in this subframe structure.

In FIG. 7, the hatched area represents a transmission region for a Physical Downlink Control Channel (PDCCH) carrying Downlink Control Information (DCI), and the last symbol is a transmission region for a Physical Uplink Control Channel (PUCCH) carrying Uplink Control Information (UCI). Here, the DCI corresponding to control information transmitted from an eNB (BS) to a UE may include information on a cell configuration that the UE should know, DL-specific information such as DL scheduling, UL-specific information such as a UL grant, etc. The UCI corresponding to control information transmitted from a UE to a BS may include an HARQ ACK/NACK report on DL data, a CSI report on a DL channel state, a Scheduling Request (SR), etc.

In FIG. 7, the unmarked area can be used for a data channel for transmitting DL data (e.g., Physical Downlink Shared Channel (PDSCH)) or a data channel for transmitting UL data (e.g., Physical Uplink Shared Channel (PUSCH)). According to this structure, an eNB (BS) can transmit DL data and receive an HARQ ACK/NACK signal from a UE in response to the DL data in a single subframe since DL transmission and UL transmission are sequentially performed in the single subframe. Consequently, when a data transmission error occurs, it is possible to reduce a time taken until data retransmission, thereby minimizing the latency of the overall data transmission.

In such a self-contained subframe structure, a time gap is required to allow a BS and a UE to switch from transmission mode to reception mode or vice versa. To this end, some OFDM symbols at the DL-to-UL switching time can be configured as a GP in this self-contained subframe structure.

In the new RAT system, the following four subframe types may be considered as examples of configurable self-contained subframe types. In the four subframe types, individual regions are arranged within a subframe in time order.

1) DL control region+DL data region+GP+UL control region

2) DL control region+DL data region

3) DL control region+GP+UL data region+UL control region

4) DL control region+GP+UL data region

Among requirements of a New RAT system, an especially important part will be an environment in which plural services requiring different measurement requirements or transmission of different control information simultaneously coexist.

Figure 8:
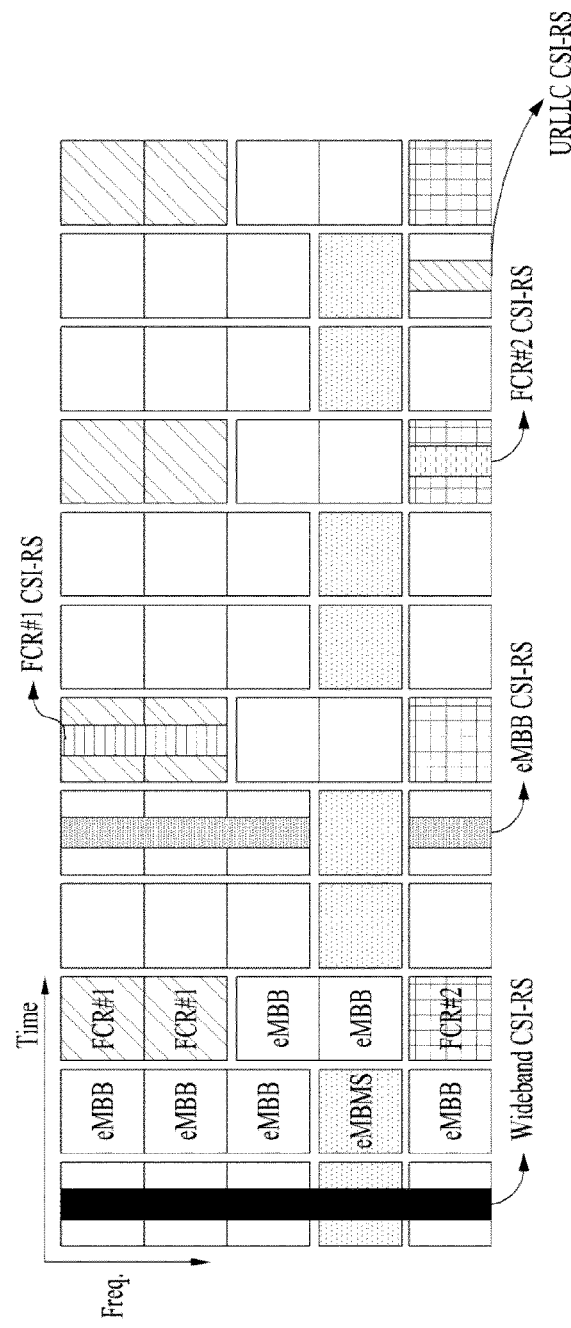
FIG. 8 is a diagram illustrating the (wideband or subband) structure of a hybrid channel state information reference signal (CSI-RS) for supporting various services in New RAT.

FIG. 8 is a diagram illustrating the (wideband or sub-band) structure of a hybrid channel state information reference signal (CSI-RS) for supporting various services in New RAT.

As illustrated in FIG. 8, in order to simultaneously support various services of New RAT, it is necessary to form heterogeneous CSI-RSs with a wideband or sub-band structure from the viewpoint of DL. Therefore, if the structure of FIG. 8 is regarded as one of the requirements of New RAT, a UL resource is also likely to be a type corresponding to this structure.

Figure 9:
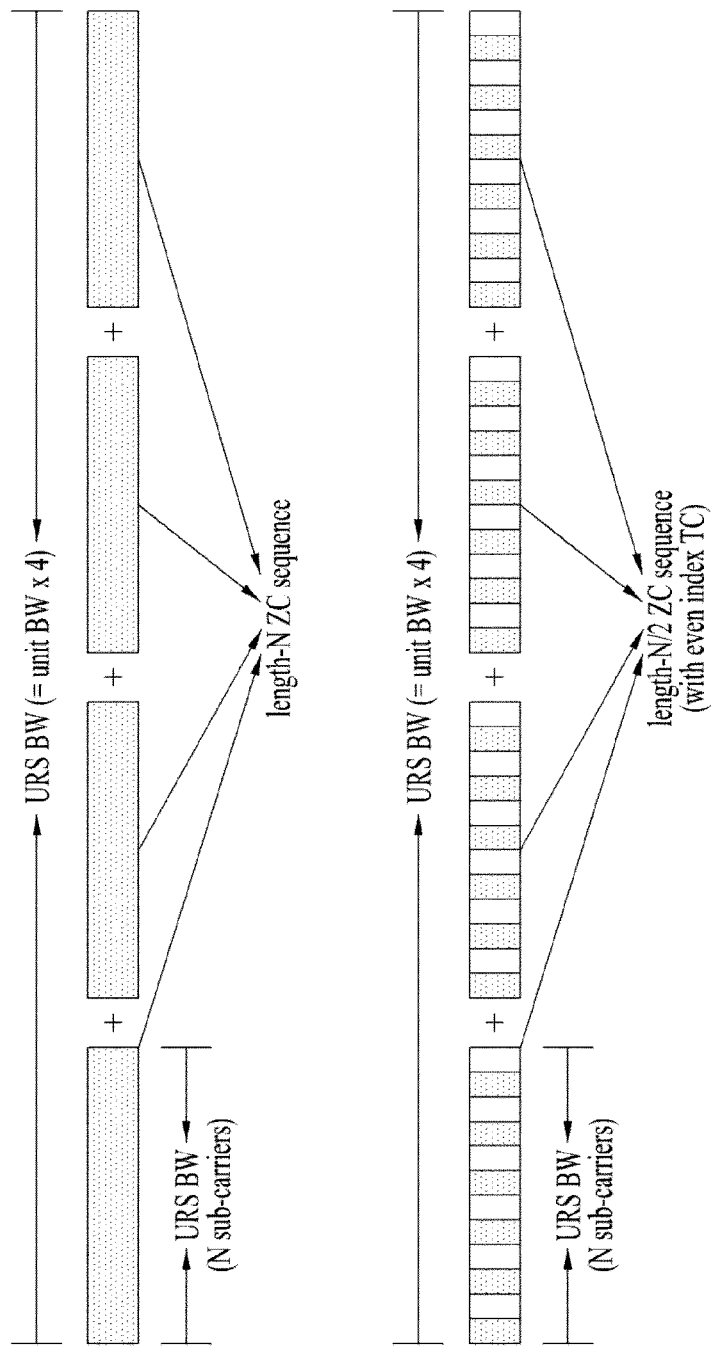
FIG. 9 is a diagram illustrating definition and deployment (including transmission combs) of a localized UL RS (URS) unit bandwidth (BW).

FIG. 9 is a diagram illustrating definition and deployment (including transmission combs) of a localized UL RS (URS) unit bandwidth (BW).

In particular, in the structure of a UL SRS (this may be referred to as an xSRS in New RAT), localized or distributed type transmission in one symbol, as well as whole band transmission of a UE, according to different service requirements, may be performed. In this structure, the SRS needs to consider a structure in which the SRS is multiplexed with another UL channel (e.g., a UL control channel), for efficient resource allocation.

As illustrated in FIG. 9, it may be appreciated that a whole band is divided into 4 localized SRS unit BWs. In particular, if a root index value of a Zadoff-Chu (ZC) sequence or a scrambling seed value of a Pseudo Random (PR) sequence is used to generate a localized SRS sequence, the localized SRS sequence may be determined according to at least one of a physical cell ID, a virtual cell ID, a UE-dedicated ID (e.g., Cell-Radio Network Temporary Identifier (C-RNTI)), a UE-common ID (e.g., a UE-common RNTI), a beam ID (or index), a subframe index, a symbol index, or an AP index, (for example, by at least one function thereof).

Structure according to UE capability requirements in New RAT

In New RAT as compared with LTE, it is expected that UE requirements of the eNB and the UE will increase as follows.

UE TRP increase: Demands for an increase in SRS dimensioning (a port, a Cyclic Shift (CS), an Orthogonal Cover Code (OCC), a transmission comb etc.)

Advanced transceiver: An advanced transceiver structure is required to improve interference measurement reporting (network assistant interference control).

UL beam tracking: A UL beam tracking structure is required when beam tracking is required for a UL channel (multi-symbol-wise SRS transmission) as well as a DL channel.

Channel reciprocity: For both cases in which reciprocity between the DL channel and the UL channel is established and is not established, structures are required or when reciprocity between the DL channel and the UL channel is not established (UL SRS needs to be supported for DL channel estimation).

For these various UE capability requirements, a dynamic and flexible SRS configuration is needed and, for efficient control, a structure capable of supporting the configuration within a single UL frame framework should be established.

In a situation in which a plurality of cells is densely deployed, UL inter-cell interference to which a target UE is subjected is greatly generated by Tx beamforming of UEs in neighboring cells (particularly, prepared cells, i.e., cells having strong RSRP during RS measurement of cells), that perform transmission at the same resource location as a resource allocated to the specific UE by a serving cell. Information needed to control such interference may include UE-specific information (i.e., beamforming pattern information of a UE of a neighboring cell directed towards a serving cell (information usable by a serving eNB (or serving cell)) to extract received RSRP of a UE of the serving eNB (or serving cell)), site-specific information (i.e., information indicating Tx beam directions of UEs of a neighboring cell, causing UEs in prepared cells to interfere with the target UE in a serving cell, and resource-specific information (i.e., information indicating whether an allocated resource is orthogonal to an interfering resource). Therefore, the serving cell needs to receive the UE-specific information/site-specific information/resource-specific information from neighboring cells to control interference.

However, when the information for interference control is transmitted through Xn signaling, Xn signaling overhead is considerably large. Therefore, it is necessary to provide reasonable Xn signaling overhead by imposing constraints on orthogonality between channels during allocation of each UL channel resource or on beam management in terms of Inter-Cell Interference Coordination (ICIC). To this end, it is necessary to consider a method of measuring and relieving interference through a resource configuration. Notably, the resource configuration needs to be designed by a method supporting a flexibility resource structure required by New RAT.

Figure 10:
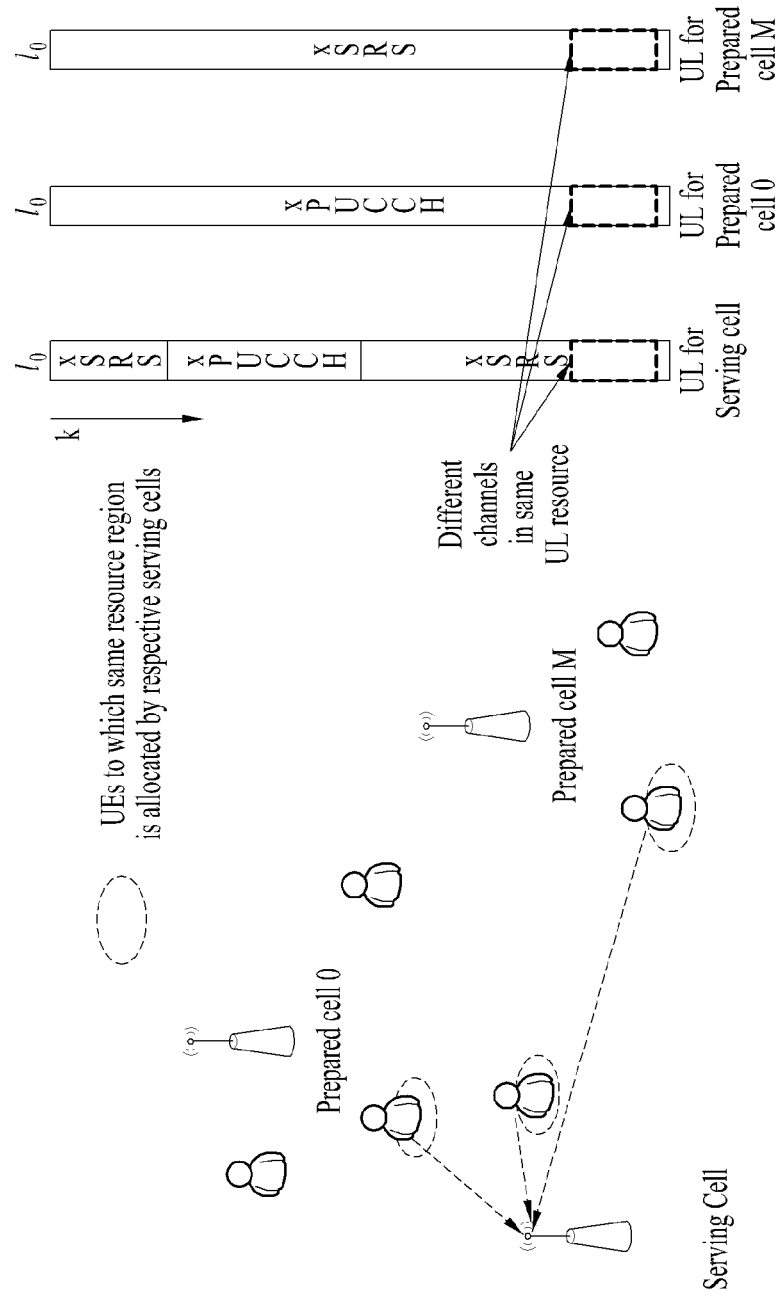
FIG. 10 is a diagram illustrating occurrence of interference according to configurations of various resource structures (localized SRS+xPUCCH, xPUCCH-only, and xSRS-only structures).

FIG. 10 is a diagram illustrating occurrence of interference according to configurations of various resource structures (localized SRS+xPUCCH, xPUCCH-only, and xSRS-only structures).

In FIG. 10, serving cells (serving cell, prepared cell 0, and prepared cell M) allocate the same resource region to respective UEs. Since the serving cells (serving cell, prepared cell 0, and prepared cell M in FIG. 10) allocate, to respective UEs, different channels or resources of different usage (a localized SRS in the serving cell, an xPUCCH in prepared cell 0, and a whole band SRS in prepared cell M) to the same resource, each channel is generated with a sequence of a different length. Therefore, there may be a problem of not fulfilling orthogonality between channels or resources.

If the serving cell and the prepared cells (or neighboring cells) generate channels with sequences of different lengths, each eNB (or cell) needs to previously know a set of all sequences of different lengths and the prepared cells need to accurately inform the serving cell of information about channel regions in which interference occurs in the prepared cells (locations for generating channels and mapping the channels to physical resources). In the case of channels of the same length, interference may be simply relieved using a method designed in terms of orthogonality between channels among methods of relieving inter-cell interference.

Figure 11:
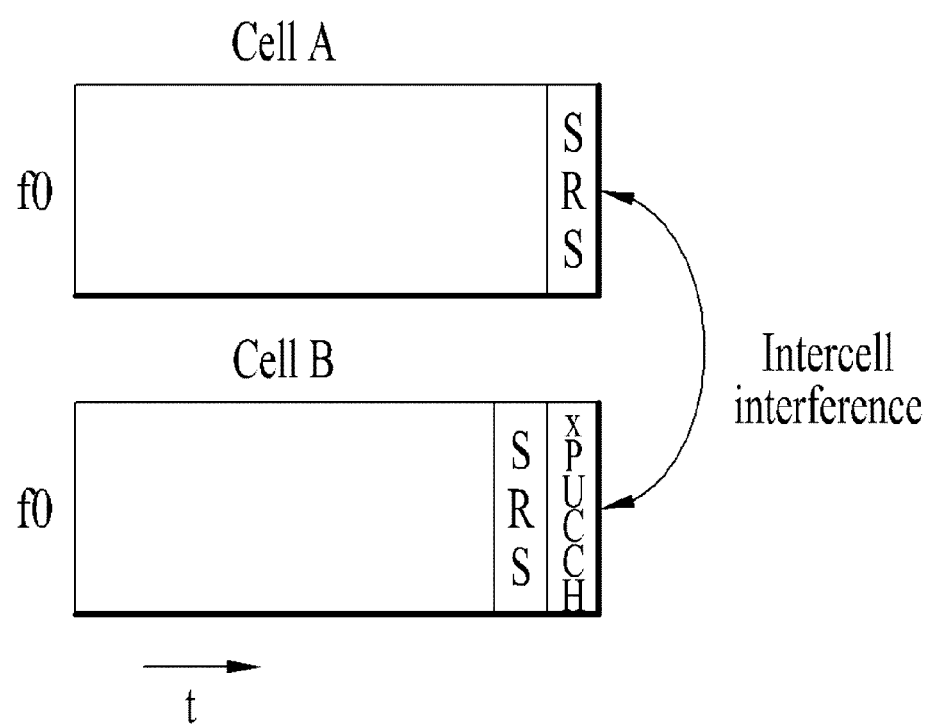
FIG. 11 is a diagram illustrating interference caused by different UL resource configurations between cells.

FIG. 11 is a diagram illustrating interference caused by different UL resource configurations between cells.

As shown in FIG. 11, inter-cell interference may occur between an SRS and a physical UL channel (xPUCCH) due to the SRS configuration of cell A and the xPUCCH configuration of cell B. To cancel the inter-cell interference, the following method may be applied.

1) An SRS and xPUCCH formats 1, 1a, and 1b are designed using a Zadoff Chu (ZC) sequence.

$$r_{u,v}^{(\alpha)}(n) = e^{j\alpha n} \bar{r}_{u,v}(n), 0 \le n < M_{sc}^{RS}$$

2) In each channel (i.e., an SRS, an xPUCCH, etc.), u for configuring the root of the ZC sequence is determined using a different group hopping method.

$$u = (f_{gh}(n_s) + f_{ss}) \bmod 30 \text{ 에서 } f_{ss}^{xPUCCH} = n_{ID}^{RS} \bmod 30, f_{ss}^{SRS} = n_{ID}^{RS} \bmod 30$$

3) xPUCCH:
$n_{ID}^{RS} = N_{ID}^{cell}$ if no value for $n_{ID}^{xPUCCH}$ is configured by higher layers,
$n_{ID}^{RS} = n_{ID}^{xPUCCH}$ otherwise.

Sounding reference signals:
$n_{ID}^{RS} = N_{ID}^{cell}$ if no value for $n_{ID}^{xSRS}$ is configured by higher layers, $n_{ID}^{RS} = n_{ID}^{xSRS}$ otherwise.

According to this method, each BS may detect individual channels by detecting different ZC sequences from an SRS and an xPUCCH even though inter-cell interference exists between the SRS and xPUCCH. However, the method is available when different channels use sequences satisfying the orthogonality condition. In particular, if the resources of an SRS overlap with those of another channel, for example, an xPUCCH format (e.g., xPUCCH format 2) in terms of signal generation, inter-cell interference may occur, and as a result, performance may be degraded.

In New RAT, New RAT resource structures and configurations may be diversified for channel and interference (inter-cell or intra-cell interference) measurement and reporting. Like a DL channel structure, a UL channel structure needs to satisfy New RAT interference configuration requirements. In particular, an SRS structure is likely to be configured as a subband-wise distributed resource structure as well as a whole band resource structure and an aperiodic network triggering access method is also likely to be mainly applied to an SRS scheduling method. Due to an issue of reciprocity efficiency, the necessity for beam refinement on UL is increasing. According to various requirements of a New RAT channel, it is necessary to re-approach an inter-cell interference problem. The present invention proposes an SRS structure and configuration method capable of satisfying interference requirements of New RAT and a method for solving an interference problem generated according to characteristics of an SRS structure.

Embodiment 1

Figure 12:
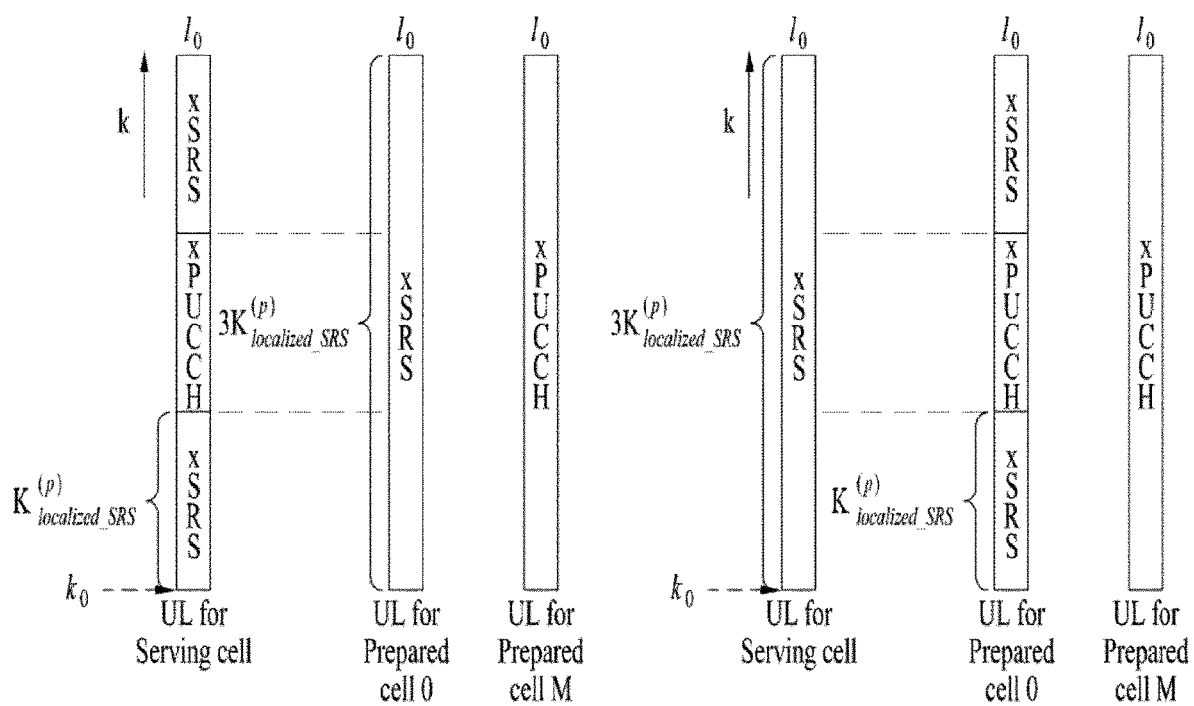
FIG. 12 is a diagram illustrating a physical resource configuration and location for localized SRS transmission and whole band SRS transmission.

FIG. 12 is a diagram illustrating a physical resource configuration and location for localized SRS transmission and whole band SRS transmission.

As Embodiment 1 of the present invention, it is proposed that a localized SRS unit length $K_{localized\_SRS}^{(p)}$ through an antenna port of an index p for ICIC be set to a common divisor of a whole band SRS unit. A physical resource location for transmission of each localized SRS is allocated as $k=nK_{localized\_SRS}^{(p)}+k_0$, may be set to a physical resource starting point for whole band SRS transmission. If the length of the localized SRS is set to a common divisor of the length of the whole band SRS unit, it may be appreciated that the length of an xPUCCH multiplexed with the localized SRS for transmission on a specific symbol is also set to a common divisor of the length of the whole band SRS unit.

FIG. 12 shows that the ratio of a resource length of the localized SRS to a resource length of the whole band SRS is 1:3. A serving cell may be aware of resource allocation information (localized SRS physical resource location information, localized SRS physical resource starting point information, etc.) of prepared cells as illustrated in FIG. 12 by receiving the information from the prepared cells or the information may be preconfigured for the serving cell.

If the serving cell is configured with the whole band SRS and the localized SRS is configured and transmitted in the prepared cells, based on the resource allocation information, the serving cell may be aware of transmission locations of the localized SRSs of the prepared cells. On the contrary, the serving cell may recognize transmission locations of the whole band SRSs of other cells through the location of the localized SRS of the serving cell.

As a detailed embodiment of Embodiment 1, in Embodiment 1-1, prepared cells to which transmission combs are applied transmit information about a field indicating whether combs are applied to the serving cell and information about the number of combs. A localized SRS or whole band SRS sequence generation length may differ according to the number of combs. As an example, if a localized SRS transmission resource of length $K_{localized\_SRS}^{(p)}$ is allocated and the number of combs is 2, an SRS sequence length is generated as $$\frac{K_{localized\_SRS}^{(p)}}{2}.$$

Therefore, flexibility may be provided for comb configuration of an SRS in each cell.

Embodiment 2

Embodiment 2 of the present invention proposes that the serving cell (or serving eNB) pre-configure a sequence set for detecting a whole band SRS sequence and a localized SRS sequence for ICIC.

Figure 13:
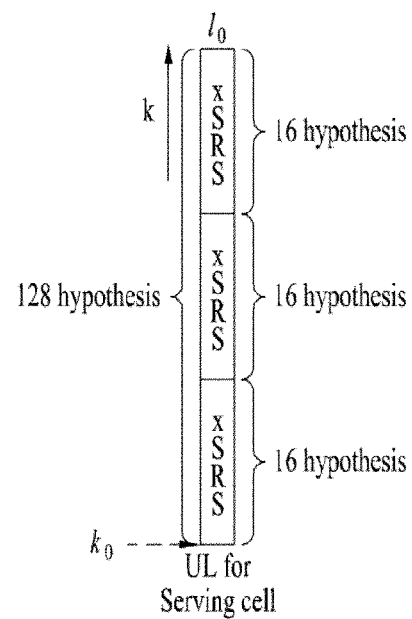
FIG. 13 is a diagram for explaining a set of localized SRS sequences and a set of whole band SRS sequences of Table 14.

If the serving eNB has a whole band SRS sequence set of length and a $M_{sc}^{SRS}$ localized SRS sequence set of length $M_{sc}^{localized\_SRS}$ and can predict a location at which interference occurs through resource allocation configuration determined as in Embodiment 1, the serving eNB may perform an orthogonal test using the localized SRS sequence set with a sequence received in a resource region in which interference is expected to occur, so that the serving eNB may detect a localized SRS sequence that creates interference in that resource region FIG. 13 is a diagram for explaining a set of localized SRS sequences and a set of whole band SRS sequences of Table 14.

As an embodiment, it is assumed that a set of whole band SRS sequences $S_k$ and a set of localized SRS sequences $S_j^{local}$ are as shown in Table 14 below and the ratio of the length of the whole band SRS sequences to the length of the localized SRS sequences is 3:1.

TABLE 14

| | Localized band SRS sequence | Whole band SRS sequence |
|---|---|---|
| Sequence length | $K_{localized\_SRS}^{(p)}$ | $3K_{localized\_SRS}^{(p)}$ |
| Orthogonal sequence set | $\{S_0^{local}, \ldots, S_{16}^{local}\}$ | $\{S_0, \ldots, S_{127}\}$ |

If localized SRS transmission is configured for prepared cells and whole band SRS transmission is configured for a serving cell, the serving cell detects an SRS sequence thereof by performing tests of 127 hypotheses for the whole band SRS sequence in a received resource region and estimates an interference level of a localized SRS by performing tests of 16 hypotheses for the localized SRS in three regions. That is, the serving cell should perform tests of a total of 127+3*16 hypotheses through SRS estimation thereof and interference estimation.

Figure 14:
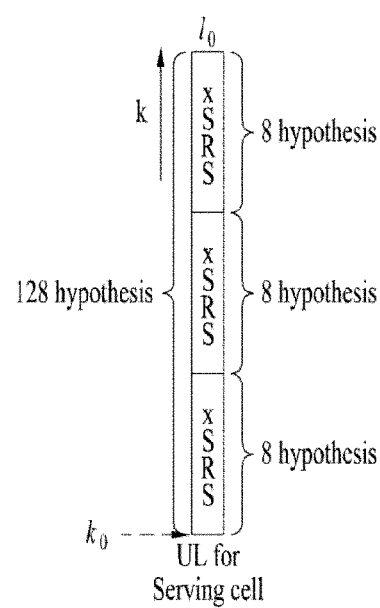
FIG. 14 is a diagram for explaining a set of localized SRS sequences and a set of whole band SRS sequences (comb value=2) of Table 15.

FIG. 14 is a diagram for explaining a set of localized SRS sequences and a set of whole band SRS sequences (comb value=2) of Table 15.

As an embodiment, it is assumed that a set of whole band SRS sequences $S_k$ and a set of localized SRS sequences $S_j^{local}$ are as shown in Table 15 below and the ratio of the length of the whole band SRS sequences to the length of the localized SRS sequences is 3:1. It is assumed that a localized SRS with a transmission comb of 2 is configured for prepared cells and such configuration information has been reported to a serving cell.

TABLE 15

| | Localized band SRS sequence | Localized band SRS sequence with comb 2 | Whole band SRS sequence |
|---|---|---|---|
| Sequence length | $K_{localized\_SRS}^{(p)}$ | $\frac{K_{localized\_SRS}^{(p)}}{2}$ | $3K_{localized\_SRS}^{(p)}$ |
| Orthogonal sequence set | $\{S_0^{local}, \ldots, S_{16}^{local}\}$ | $\{S_0^{local}, \ldots, S_8^{local}\}$ | $\{S_0, \ldots, S_{127}\}$ |

In order for the serving cell to detect an SRS sequence of a UE in the serving cell and detect interference sequences of the prepared cells, a total of 128+3*8 hypotheses is needed.

As another example, it is assumed that a localized SRS and a localized SRS with a transmission comb of 2 are configured for the prepared cells and such configuration has been reported to the serving cell.

In an environment in which the localized SRS and the localized SRS with the comb value coexist, the serving cell may detect the SRS sequence of the UE in the serving cell and the interference sequences of the prepared cells from the 128+3*16+3*8 hypotheses.

Embodiment 3

When a beam ID, a UE ID, and a physical cell ID are included in a sequence, if the serving eNB detects a sequence generated through a root index of a ZC sequence or a scrambling seed of a PR sequence as an interference sequence through Embodiment 2, the serving cell may transmit the following four related information to a target prepared cell.
  Information about a physical resource index $k_{localized\_SRS}^{(p)}$ according to a localized SRS unit for an antenna port having an index p as information about a physical resource region in which the serving cell confirms that interference occurs
  A serving cell ID
  A UE ID of a UE that creates interference in the resource region
  A Tx beam ID of a UE that creates interference in the resource region As a detailed embodiment of Embodiment 3, in Embodiment 3-1, if prepared cells receive the above four information in Embodiment 3 from the serving cell, the prepared cells do not allocate a resource in the resource region to a corresponding UE that creates interference in the physical resource region or the prepared cells allocate an SRS and a UL channel corresponding to a beam direction other than an SRS corresponding to a beam ID of a corresponding UE that creates interference in the physical resource region.

Embodiment 4

Figure 15:
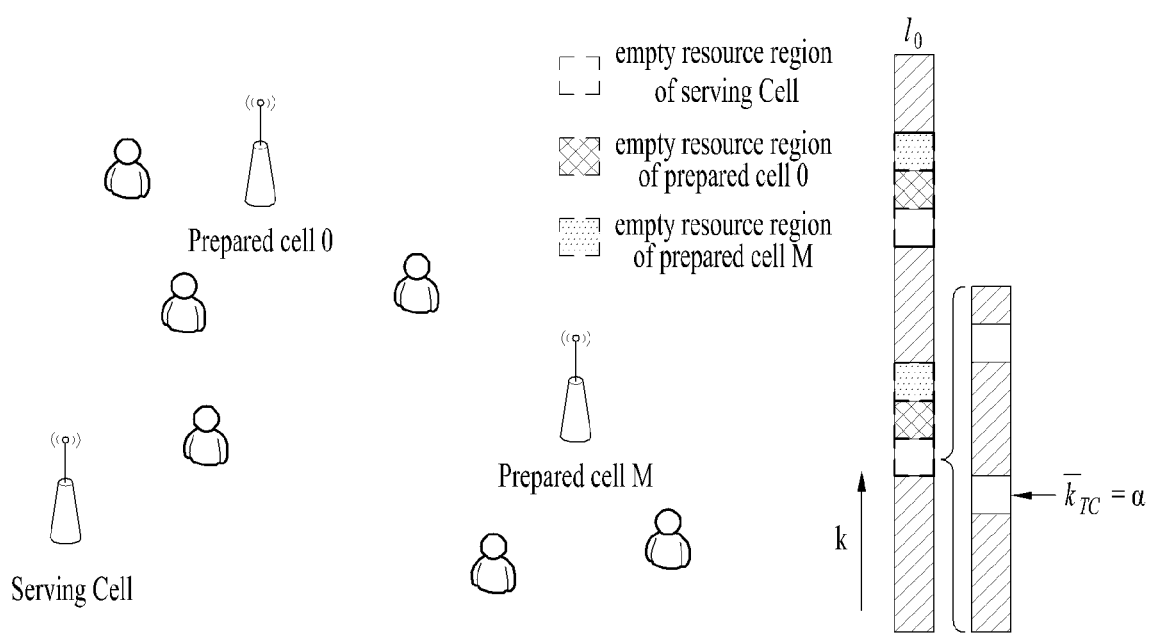
FIG. 15 is a diagram illustrating a method of allocating an empty resource region for ICI measurement.

FIG. 15 is a diagram illustrating a method of allocating an empty resource region for ICI measurement.

As an embodiment according to the present invention, a serving eNB may indicate resource allocation configuration to UEs to transmit an SRS resource by emptying a part of the SRS resource for Inter-Cell Interference (ICI) measurement. The serving eNB may indicate that a resource is not allocated in a specific comb index $\bar{k}_{TC}=\alpha(cell\_ID)$ in a comb structure. The location of an empty resource may be distinguished by IDs of prepared cells and the serving cell.

In FIG. 15, an empty resource region of a serving cell, an empty resource region of prepared cell 0, and an empty resource region of prepared cell M are illustrated. These empty resource regions may be configured in an RB unit, an RE unit, or an SRS resource unit.

Embodiment 5

Figure 16:
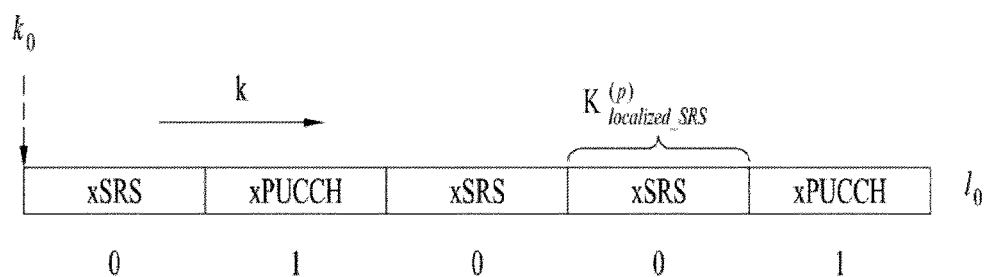
FIG. 16 is a diagram illustrating a bitmap during multiplexing of an xSRS and an xPUCCH.

FIG. 16 is a diagram illustrating a bitmap during multiplexing of an xSRS and an xPUCCH.

As an embodiment of the present invention, in Embodiment 5, if a serving cell or prepared cells in which a localized SRS is multiplexed with another UL channel (e.g., xPUCCH) are present, the length of the xPUCCH is used by scaling the length $K_{localized\_SRS}^{(p)}$ of the localized SRS and the location of the xPUCCH may be provided to a UE by the serving eNB through a bitmap, i.e., the length of the xPUCCH is set to $\beta K_{localized\_SRS}^{(p)}$ (where $\beta$ is an integer), so that interference measurement may be facilitated.

As an example, when a specific prepared cell multiplexes an SRS and an xPUCCH on a specific symbol and transmits the same, if the ratio of the length of a whole band SRS to the length of a localized SRS is 5:1 and the serving cell transmits a bitmap [01010] as illustrated in FIG. 16, the serving cell may recognize that the specific prepared cell uses the second and fifth divided resources for the xPUCCH.

Figure 17:
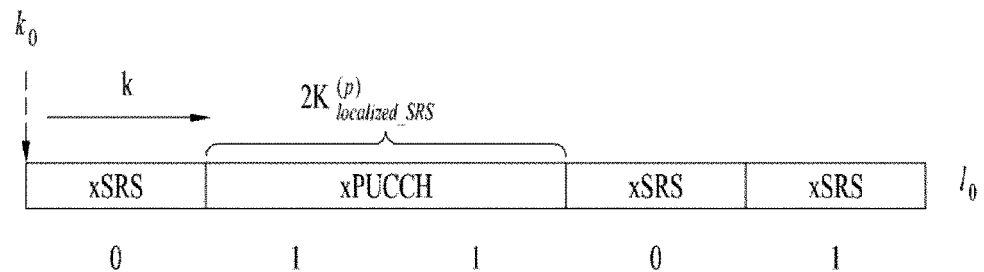
FIG. 17 is a diagram illustrating a bitmap during multiplexing of an xSRS and an xPUCCH when the length of the xSRS is differently configured from the length of the xPUCCH.

FIG. 17 is a diagram illustrating a bitmap during multiplexing of an xSRS and an xPUCCH when the length of the xSRS is differently configured from the length of the xPUCCH.

As opposed to FIG. 16, in FIG. 17, when the length of the xPUCCH is set to $2K_{localized\_SRS}^{(p)}$ which doubles the length of the xSRS, the xPUCCH is concatenated in the bitmap and transmitted as illustrated in FIG. 17. That is, the bitmap may be represented as [01100].

As described above, an efficient interference measurement method may be supported in terms of ICIC according to an embodiment of the present invention and communication performance may be improved through resource allocation between a serving cell and prepared cells, when multiplexing of a localized SRS, a whole band SRS, and another uplink channel is supported.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of controlling inter-cell interference caused by SRS transmission in a wireless communication system and the apparatus therefor are industrially applicable to various wireless communication systems such as a 3GPP LTE/LTE-A system and a 5G communication system.

What is claimed is:

1. A method of controlling, by a Base Station (BS), inter-cell interference caused by a Sounding Reference Signal (SRS) transmission of a User Equipment (UE) in a cell to which the BS belongs in a wireless communication system, the method comprising:
receiving information about a physical resource region in which interference is caused with respect to a neighboring cell by the SRS transmission of the UE, information about an identifier (ID) of the UE, and information about a transmission beam ID of the UE from a neighboring BS; and
allocating an SRS or another uplink channel corresponding to a transmission beam ID other than the transmission beam ID of the UE in the physical resource region to the UE.

2. The method of claim 1,
wherein the information about the physical resource region includes at least one of information about a resource length on a frequency domain allocated for localized SRS transmission on a specific symbol or information about a physical resource starting point for the localized SRS transmission.

3. The method of claim 2,
wherein a resource length of the localized SRS in the allocated frequency domain corresponds to a common divisor of a resource length of a whole band SRS in the frequency domain.

4. The method of claim 1, further comprising
transmitting information indicating that an SRS corresponding to the transmission beam ID other than the transmission beam ID of the UE has been allocated to the UE.

5. The method of claim 4, further comprising
receiving the SRS corresponding to the transmission beam ID other than the transmission beam ID of the UE through the physical resource region from the UE.

6. The method of claim 1, further comprising
receiving the SRS corresponding to the transmission beam ID other than the transmission beam ID of the UE through the physical resource region from the UE.

7. The method of claim 1,
wherein the information about the physical resource region includes information indicating a physical resource location of a localized SRS unit on a specific symbol.

8. A Base Station (BS) for controlling inter-cell interference caused by Sounding Reference Signal (SRS) transmission of a User Equipment (UE) in a cell to which the BS belongs in a wireless communication system, the BS comprising:
a receiver; and
a processor,
wherein the processor controls the receiver to receive information about a physical resource region in which interference is caused with respect to a neighboring cell by the SRS transmission of the UE, information about an identifier (ID) of the UE, and information about a transmission beam ID of the UE from a neighboring BS, and
allocates an SRS or another uplink channel corresponding to a transmission beam ID other than the transmission beam ID of the UE in the physical resource region to the UE.

9. The BS of claim 8,
wherein the information about the physical resource region includes at least one of information about a resource length on a frequency domain allocated for localized SRS transmission on a specific symbol or information about a physical resource starting point for the localized SRS transmission.

10. The BS of claim 9,
wherein a resource length of the localized SRS in the allocated frequency domain corresponds to a common divisor of a resource length of a whole band SRS in the frequency domain.

11. The BS of claim 8, further comprising
a transmitter,
wherein the processor controls the transmitter to transmit information indicating that an SRS corresponding to the transmission beam ID other than the transmission beam ID of the UE has been allocated to the UE.

12. The BS of claim 11,
wherein the processor controls the receiver to receive the SRS corresponding to the transmission beam ID other than the transmission beam ID of the UE through the physical resource region from the UE.

13. The BS of claim 8,
wherein the processor controls the receiver to receive the SRS corresponding to the transmission beam ID other than the transmission beam ID of the UE through the physical resource region from the UE.

14. The BS of claim 8,
wherein the information about the physical resource region includes information indicating a physical resource location of a localized SRS unit on a specific symbol.

* * * * *